(12) United States Patent
Park et al.

(10) Patent No.: US 11,261,960 B2
(45) Date of Patent: Mar. 1, 2022

(54) APPARATUS AND METHOD FOR CONTROLLING TRANSMISSION OF VEHICLE

(71) Applicants: Hyundai Motor Company, Seoul (KR); Kia Motors Corporation, Seoul (KR)

(72) Inventors: Kwang Hee Park, Suwon-si (KR); Byeong Wook Jeon, Seoul (KR); Dong Hoon Jeong, Hwaseong-si (KR); Jae Chang Kook, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/077,533

(22) Filed: Oct. 22, 2020

(65) Prior Publication Data

US 2021/0372520 A1    Dec. 2, 2021

(30) Foreign Application Priority Data

May 27, 2020    (KR) .......................... 10-2020-0063810

(51) Int. Cl.
*F16H 61/02*    (2006.01)
*F16H 59/44*    (2006.01)
(Continued)

(52) U.S. Cl.
CPC .......... *F16H 61/0213* (2013.01); *F16H 59/44* (2013.01); *F16H 59/70* (2013.01);
(Continued)

(58) Field of Classification Search
CPC .......... F16H 59/44; F16H 59/46; F16H 59/70; F16H 61/0213; F16H 61/04;
(Continued)

(56) References Cited

U.S. PATENT DOCUMENTS 6,220,986 B1 *  4/2001  Aruga .................... F16H 61/16
                                                    477/97
6,292,736 B1 *  9/2001  Aruga ................ F16H 61/0213
                                                    701/95

(Continued)

FOREIGN PATENT DOCUMENTS

KR    10-2020-0141641 A    12/2020

*Primary Examiner* — Edwin A Young
(74) *Attorney, Agent, or Firm* — Morgan, Lewis & Bockius LLP (57) ABSTRACT

An apparatus and a method for controlling a transmission of a vehicle may include a determining device configured to determine whether to perform a front-vehicle-based deceleration following control based on information on the vehicle and information on the front vehicle when coasting of the vehicle is started, a calculating device configured to determine a target speed of the vehicle and a target distance based on a position, a speed, and a moving distance of the front vehicle, when the front-vehicle-based deceleration following control is determined to be performed, a gear-shifting stage deciding device configured to decide a final gearshifting stage of the transmission based on the determined target speed and the target distance by configuring a deceleration profile for each gearshifting stage of the transmission, and a controller to control the transmission based on the final gearshifting stage.

20 Claims, 10 Drawing Sheets

(51) Int. Cl.
*F16H 59/70* (2006.01)
*F16H 61/00* (2006.01)

(52) U.S. Cl.
CPC ............... *F16H 2061/0081* (2013.01); *F16H 2061/0234* (2013.01); *F16H 2312/00* (2013.01); *F16H 2708/22* (2013.01)

(58) Field of Classification Search
CPC ..... F16H 2061/0081; F16H 2061/0234; F16H 2061/022; F16H 2312/00; F16H 2708/22; F16H 2059/186
See application file for complete search history.

(56) References Cited

U.S. PATENT DOCUMENTS

| | | | |
|---|---|---|---|
| 2005/0125137 A1* | 6/2005 | Shiiba | B60W 30/18109 701/96 |
| 2012/0029776 A1* | 2/2012 | Staudinger | F16H 61/68 701/55 |
| 2016/0019792 A1* | 1/2016 | Kawamata | G07C 5/0816 701/70 |
| 2020/0391592 A1 | 12/2020 | Jeon et al. | |

* cited by examiner

APPARATUS AND METHOD FOR CONTROLLING TRANSMISSION OF VEHICLE

CROSS-REFERENCE TO RELATED APPLICATION

The present application claims priority to Korean Patent Application No. 10-2020-0063810, filed on May 27, 2020, the entire contents of which is incorporated herein for all purposes by this reference.

BACKGROUND OF THE INVENTION

Field of the Invention

The present invention relates to an apparatus and a method for controlling a transmission of a vehicle, and more particularly to a technology of controlling a gearshifting stage based on a moving distance of a front vehicle when controlling the transmission while decelerating the front vehicle.

Description of Related art

An automatic transmission is a device to automatically control a gearshifting stage depending on a driving situation and the acceleration intention of a driver, improving the convenience of a driver.

The automatic transmission performs gear shifting only depending on a gearshifting stage determining map for a vehicle speed, which is preset in an automatic transmission control unit (TCU), because the automatic transmission cannot recognize the speed of a front vehicle.

Accordingly, when the speed of the front vehicle is higher than the speed of a host vehicle, the driver accelerates the host vehicle to follow the front vehicle. However, when the speed of the host vehicle is higher than the speed of the front vehicle, the driver inevitably decelerates the host vehicle.

When the driver decelerates the vehicle to reduce the speed of the vehicle as described above, the driver has to operate a brake pedal again when the decrement in the speed of the host vehicle is less after an accelerator Tip-out (accelerator Off), or has to operate the accelerator pedal when the speed of the host vehicle is more rapidly reduced.

As described above, as an accelerating degree and/or a braking extent to follow the front vehicle is increased, the convenience of the driver may be decreased. Furthermore, the fuel consumption may be increased due to the re-accelerating operation after decelerating.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling a transmission of a vehicle, configured for determining the optimal gearshifting stage depending on a position of a front vehicle, a speed of the front vehicle, and a moving distance of the front vehicle when the vehicle decelerates based on the difference in speed between the vehicle and the front vehicle to reduce the number of times to decelerate or decelerate again, improving the driving convenience, and of decelerating the vehicle with an excellent fuel efficiency.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of controlling a transmission of a vehicle may include a determining device configured to determine whether to perform a front-vehicle-based deceleration following control based on information on the vehicle and information on the front vehicle when coasting of the vehicle is started, a calculating device configured to determine a target speed of the vehicle and a target distance based on a position of the front vehicle, a speed of the front vehicle, and a moving distance of the front vehicle, when the front-vehicle-based deceleration following control is determined to be performed, a gearshifting stage deciding device configured to decide a final gearshifting stage of the transmission based on the determined target speed and the target distance by configuring a deceleration profile for each gearshifting stage of the transmission, and a controller to control the transmission based on the final gearshifting stage.

According to various exemplary embodiments of the present invention, the determining device may perform the front-vehicle-based deceleration following control when a distance between the vehicle and the front vehicle and a speed of the vehicle satisfy predetermined conditions.

According to various exemplary embodiments of the present invention, the determination device may determine whether the distance between the vehicle and the front vehicle exceeds a minimum reference distance and is less than a maximum reference distance.

According to various exemplary embodiments of the present invention, the determination device may determine whether the speed of the vehicle exceeds a value obtained by adding a set value to the speed of the front vehicle.

According to various exemplary embodiments of the present invention, the determination device may perform the front-vehicle-based deceleration following control when the distance between the vehicle and the front vehicle exceeds a minimum reference distance and is less than a maximum reference distance, and when the speed of the vehicle exceeds the value obtained by adding the set value to the speed of the front vehicle.

According to various exemplary embodiments of the present invention, the calculating device may determine the target speed by adding a critical value to the speed of the front vehicle.

According to various exemplary embodiments of the present invention, the critical value may be a value between a minimum critical speed and a maximum critical speed, which are preset, and varied depending on a change in the speed of the front vehicle.

According to various exemplary embodiments of the present invention, the calculating device may determine the target distance obtained by adding up a value, which is obtained by subtracting an offset distance from a distance between the vehicle and the front vehicle, and the moving distance of the front vehicle for a specific time.

According to various exemplary embodiments of the present invention, the offset distance may be set as an inter-vehicle distance maintained based on the speed of the front vehicle.

According to various exemplary embodiments of the present invention, the determination device may determine whether a relative speed between the vehicle and the front vehicle is less than a predetermined speed.

According to various exemplary embodiments of the present invention, the determination device may release front-vehicle-based deceleration following control, when the relative speed between the vehicle and the front vehicle is less than the predetermined speed.

According to various exemplary embodiments of the present invention, the gearshifting stage deciding device may identify a target position based on the target distance, and determine, as the final gearshifting stage, a gearshifting stage corresponding to the target speed at the target position based on the deceleration profile for each gearshifting stage of the transmission.

According to various aspects of the present invention, a method for controlling a transmission of a vehicle may include determining whether to perform a front-vehicle-based deceleration following control based on information on the vehicle and information on a front vehicle when coasting of the vehicle is started, determining a target speed of the vehicle and a target distance based on a position of the front vehicle, a speed of the front vehicle, and a moving distance of the front vehicle, when the front-vehicle-based deceleration following control is determined to be performed, deciding a final gearshifting stage of the transmission based on the determined target speed and the determined target distance by configuring a deceleration profile for each gearshifting stage of the transmission, and controlling the transmission based on the final gearshifting stage.

According to various exemplary embodiments of the present invention, the determining of whether to perform the front-vehicle-based deceleration following control may include determining the front-vehicle-based deceleration following control to be performed, when a distance between the vehicle and the front vehicle and a speed of the vehicle satisfy predetermined conditions.

According to various exemplary embodiments of the present invention, the determining of whether to perform the front-vehicle-based deceleration following control may further include determining whether the distance between the vehicle and the front vehicle exceeds a minimum reference distance and is less than a maximum reference distance.

According to various exemplary embodiments of the present invention, the determining of whether to perform the front-vehicle-based deceleration following control may further include determining whether the speed of the vehicle exceeds a value obtained by adding a set value to the speed of the front vehicle.

According to various exemplary embodiments of the present invention, the determining of the target speed and the target distance may include determining the target speed by adding a critical value to the speed of the front vehicle, and determining the target distance obtained by adding up a value, which is obtained by subtracting an offset distance from a distance between the vehicle and the front vehicle, and the moving distance of the front vehicle for a specific time.

According to various exemplary embodiments of the present invention, the critical value may be a value between a minimum critical speed and a maximum critical speed, which are preset, and be varied depending on a change in the speed of the front vehicle.

According to various exemplary embodiments of the present invention, the offset distance may be set as an inter-vehicle distance maintained based on the speed of the front vehicle.

According to various exemplary embodiments of the present invention, the deciding of the final gearshifting stage may include identifying a target position based on the target distance, and determining, as the final gearshifting stage, a gearshifting stage corresponding to the target speed at the target position based on the deceleration profile for each gearshifting stage of the transmission.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to accompanying drawings. In adding the reference numerals to the components of each drawing, it may be noted that the identical or equivalent component is designated by the identical numeral even when they are displayed on other drawings. Furthermore, in the following description of various exemplary embodiments of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined in the present application.

Hereinafter, embodiments of the present invention will be described with reference to FIGS. 1 to 10.

Figure 1:
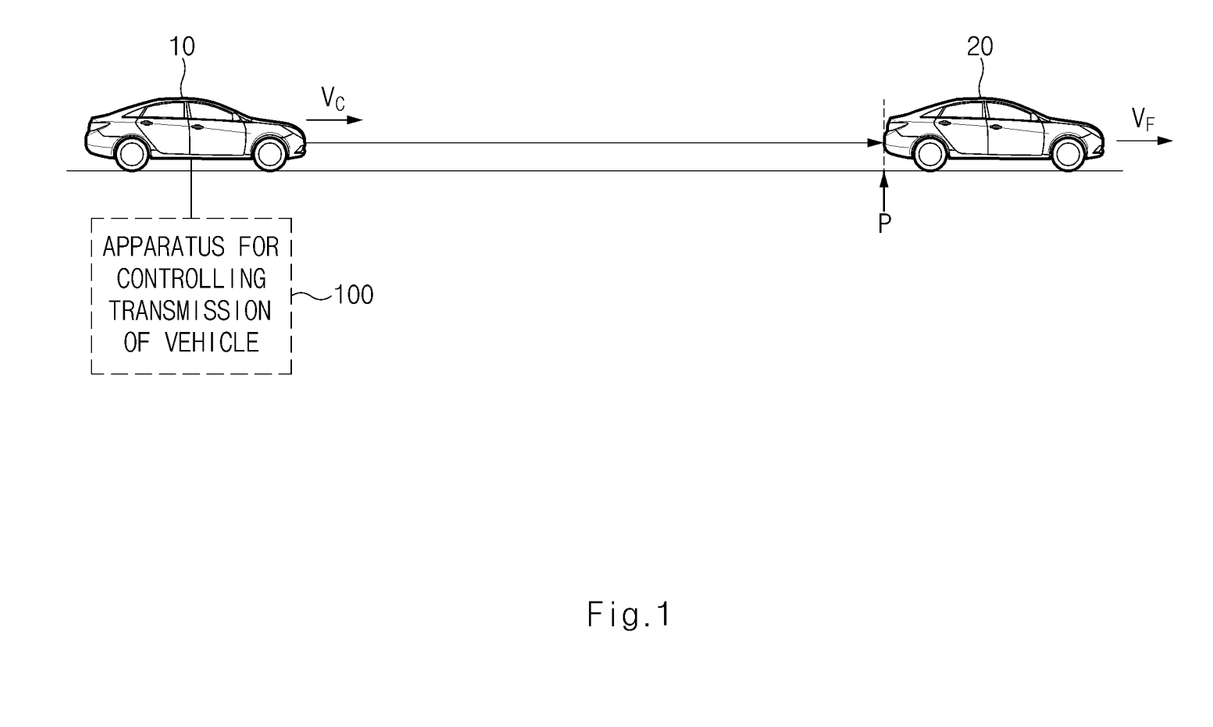
FIG. 1 is a view exemplarily illustrating a system employing an apparatus of controlling the transmission of a vehicle, according to various exemplary embodiments of the present invention.

FIG. 1 is a view exemplarily illustrating a system employing an apparatus of controlling the transmission of a vehicle, according to various exemplary embodiments of the present invention.

Referring to FIG. 1, an apparatus 100 for controlling a transmission of a vehicle may be implemented inside a vehicle. Furthermore, the apparatus 100 for controlling the transmission of the vehicle may be formed integrally with the internal control units of the vehicle or may be implemented separately from the internal control units of the vehicle to be connected to the internal control units of the vehicle through a separate connector.

Referring to FIG. 1, the apparatus 100 for controlling the transmission of the vehicle may detect whether a front vehicle 20 is present within a reference range in front, by use of a sensor such as a radar, when coasting is started, as an accelerator (hereinafter, referred to as "accel") OFF state or a brake OFF state comes during running. For example, the apparatus 100 for controlling the transmission of the vehicle may detect whether the front vehicle 20 is present within a preset distance (e.g., 150 m) in front.

The apparatus 100 for controlling the transmission of the vehicle may detect a distance and/or a relative speed between a vehicle 10 and the front vehicle 20, when the front vehicle 20 is present within the reference range. Alternatively, the apparatus 100 for controlling the transmission of the vehicle may obtain, from a navigation system 15, information on a present position of the vehicle 10 and information in a state of a front road of the vehicle 10.

In the instant case, the apparatus 100 for controlling the transmission of the vehicle may determine whether to perform deceleration following control based on the distance between the vehicle 10 and the front vehicle 20, and a speed of the vehicle 10 or the front vehicle 20.

The apparatus 100 for controlling the transmission of the vehicle may determine a target speed of the vehicle and a target position based on the speed of the front vehicle 20, a position of the front vehicle 20, and a moving distance of the front vehicle 20 for a time of 't', when performing the deceleration following control and may control the transmission of the vehicle 10, based on a deceleration profile.

Accordingly, the detailed configuration of the apparatus 100 for controlling the transmission of the vehicle will be described by making reference to an exemplary embodiment of FIG. 2.

Figure 2:
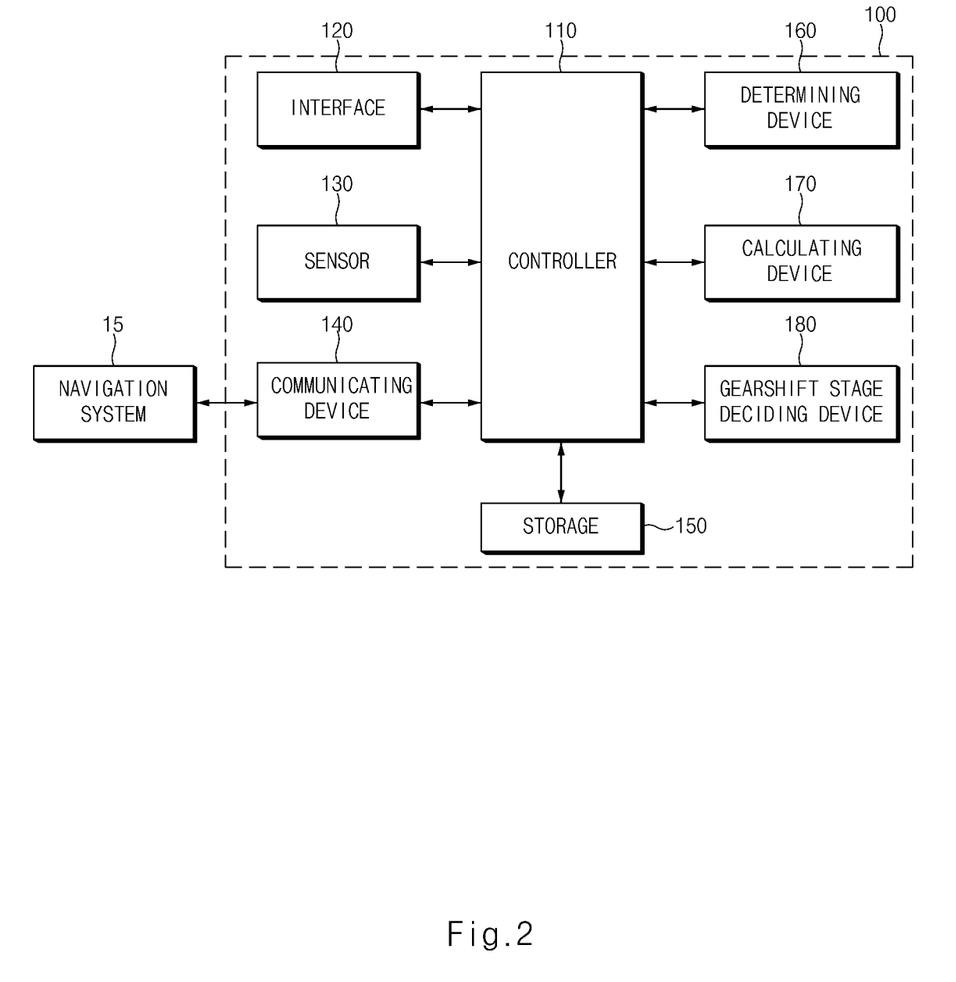
FIG. 2 is a view exemplarily illustrating components of an apparatus of controlling a transmission of a vehicle, according to various exemplary embodiments of the present invention.

FIG. 2 is a view exemplarily illustrating components of an apparatus of controlling a transmission of a vehicle, according to various exemplary embodiments of the present invention.

Referring to FIG. 2, the apparatus 100 for controlling the transmission of the vehicle may include a controller 110, an interface 120, a sensor 130, a communicating device 140, a storage 150, a determining device 160, a calculating device 170, and a gearshifting stage deciding device 180. In the instant case, according to the exemplary embodiment of the present invention, at least one of the controller 110, the determining device 160, the calculating device 170, or the gearshifting stage deciding device 180 in the apparatus 100 may be implemented with at least one processor. In the instant case, the controller 110 may be implemented in a form of including the determining device 160, the calculating device 170, and the gearshifting stage deciding device 180.

The controller 110 may process signals transmitted between the components of the apparatus 100 for controlling the transmission of the vehicle.

The interface 120 may include an input device to receive a control command from a user and an output device to output the operation state and the operation result of the apparatus 100 for controlling the transmission of the vehicle.

In the instant case, the input device may include a key button, and may include a mouse, a joystick, a jog shuttle, a stylus pen, or the like. Furthermore, the input device may include a soft key implemented on a display.

The output device may include a display. In the case that a touch sensor, such as a touch film, a touch sheet, or a touch pad, is included in the display, the display may operate as a touch screen, and the input device and the output device may be implemented in the integral form.

In the instant case, the display may include at least one of a liquid crystal display (LCD), a thin film transistor-liquid crystal display (TFT LCD), an organic light-emitting diode (OLED), a flexible display, a field emission display (FED), or a three dimensional display (3D display).

The sensor 130 may include one or more sensors that detect an obstacle, such as a front vehicle, positioned around the vehicle and measure a distance to the front vehicle 20 and/or a relative speed with respect to the front vehicle 20. For example, the sensor 130 may include a radar, an ultrasonic sensor, a scanner, and/or a camera. Furthermore, various sensors may be employed as long as the sensors may detect an obstacle and measure a distance. Meanwhile, the sensor 130 may further include a sensor to measure the speed and/or the acceleration of the vehicle 10.

The communicating device 140 may include a communication module for communicating with electronic portions or control units provided in the vehicle. For example, the communication module may be communicated to the navigation system 15 provided in the vehicle 10 to receive, from the navigation system 15, the information on the position of the vehicle 10 and/or the information on the state of the front road of the vehicle 10.

In the instant case, the vehicle network communication technology may include a controller area network (CAN) communication technology, a local interconnect network (LIN) communication technology, a FlexRay communication technology. In the instant case, the communicating device 140 may further include a module for wireless Internet access or a module for short range communication.

The wireless Internet technology may include a wireless LAN (WLAN), a wireless broadband (Wibro), a Wi-Fi, Worldwide Interoperability for Microwave Access (WiMAX). The short range communication technology may include Bluetooth, ZigBee, ultra wideband (UWB), radio frequency identification (RFID), or infrared data association (IrDA).

The storage 150 may store data and/or algorithms necessary for the apparatus 100 for controlling the transmission of the vehicle to operate.

For example, the storage 150 may store the information on the position of the vehicle 10 and/or the information on the state of the front road of the vehicle 10, which is received from the navigation system 15, for example, information on a curvature and a gradient. Furthermore, the storage 150 may store information on the front vehicle 20 which is detected by the sensor 130. Furthermore, the storage 150 may store a command and/or an algorithm to determine a target speed of the vehicle and a target position based on the information on the position of the vehicle 10 and information (e.g., information on a position, speed, or moving distance) on the front vehicle 20, to perform the deceleration following control, and to decide the final gearshifting stage to control the gear shifting.

In the instant case, the storage 150 may include a storage medium, such as a random access memory (RAM), a static random access memory (SRAM), a read only memory (ROM), a programmable read-only memory (PROM), an electrically erasable programmable read-memory, or the like.

The determining device 160 may determine whether to perform the deceleration following control (front-vehicle-based deceleration following control) based on the front vehicle 20, depending on the position and the speed of the vehicle 10, the position and the speed of the front vehicle 20, and the distance between the vehicle 10 and the front vehicle 20, when a present state is switched to a coasting state as the accel OFF state or a brake OFF state For example, the determining device 160 determines whether the distance between the vehicle 10 and the front vehicle 20 exceeds a minimum reference distance and is less than a maximum reference distance. The determining device 160 determines whether the speed of the vehicle 10 exceeds a value obtained by adding a set value to the speed of the front vehicle 20.

The determining device 160 may determine whether a relative speed between the vehicle 10 and the front vehicle 20 is less than a predetermined speed. For example, the relative speed between the vehicle 10 and the front vehicle 20 may be 1 KPH, but the present invention is not limited thereto. The controller 110 may release the front-vehicle-based deceleration following control, when the relative speed between the vehicle 10 and the front vehicle 20 is determined as being less than the predetermined speed.

The determining device 160 may determine the front-vehicle-based deceleration following control to be performed, when it is determined that the distance between the vehicle 10 and the front vehicle 20 exceeds the minimum reference distance and is less than the maximum reference distance, and when it is determined that the speed of the vehicle 10 exceeds the value obtained by adding the set value to the speed of the front vehicle 20.

Accordingly, the determining device 160 may transmit the determination result to the calculating device 170, the gearshifting stage deciding device 180, and/or the controller 110. Accordingly, the controller 110 may perform the deceleration following control based on the front vehicle 20, when it is determined, by the determining device 160, that the deceleration following control based on the front vehicle 20 is performed.

The calculating device 170 determines the target speed and the target distance when it is determined that the deceleration following control based on the front vehicle 20 is performed as the determination result of the determining device 160.

In the instant case, the calculating device 170 may determine, as the target speed ($V_{ct}$) of the vehicle 10, a value obtained by adding a critical value ($V_{CAL}$) to the speed of the front vehicle 20. In the instant case, the critical value may be set to a value between a minimum critical speed and a maximum critical speed, which are preset, and may be varied depending on the change in the speed of the front vehicle.

Figure 3A:
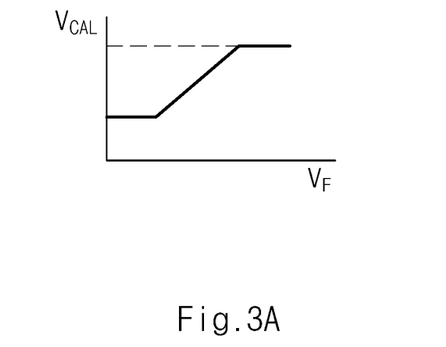
FIG. 3A is a graph illustrating a variation of a critical value depending on a speed of a front vehicle, according to various exemplary embodiments of the present invention.
Figure 3B:
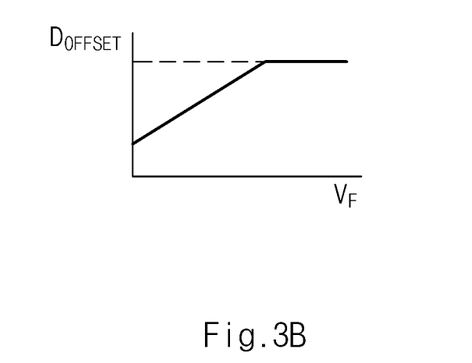
FIG. 3B is a graph illustrating a variation of an offset distance depending on a speed of a front vehicle, according to various exemplary embodiments of the present invention.

An exemplary embodiment for the critical value varied depending on the change in the speed of the front vehicle 20 will be described later with reference to FIG. 3A.

Furthermore, the calculating device 170 may determine the target distance of the vehicle 10 to a value, which is obtained by adding up a value obtained by subtracting an offset distance from a distance between the vehicle 10 and the front vehicle 20, and a moving distance of the front vehicle 20 for the time of 't'. In the instant case, the offset distance may be set to an inter-vehicle distance maintained based on the speed of the front vehicle 20.

Figure 4:
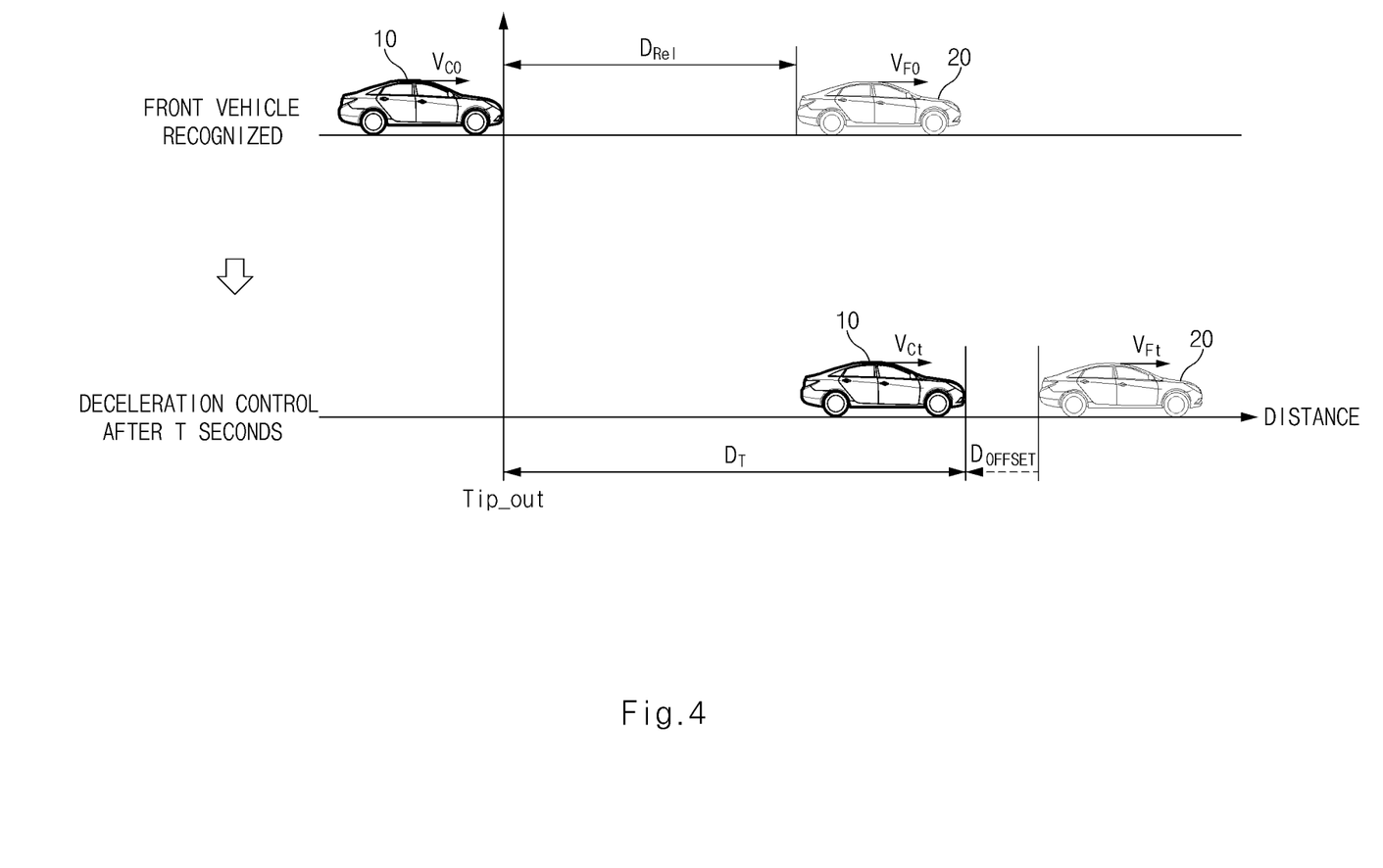
FIG. 4 and FIG. 5 are views used as references for describing a method for determining a target distance based on a moving distance of a front vehicle of an apparatus of controlling a transmission of a vehicle, according to various exemplary embodiments of the present invention.
Figure 5:
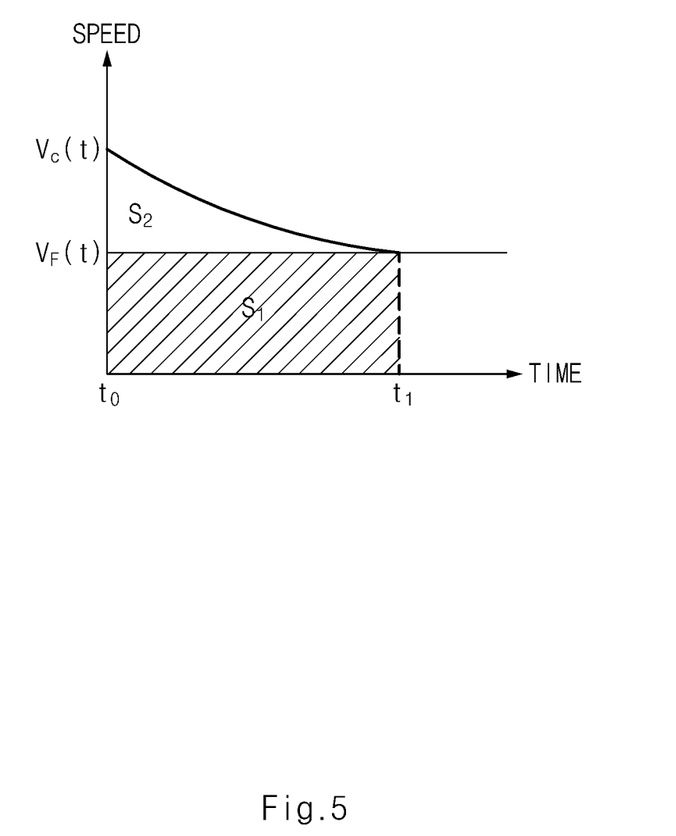

In other words, the calculating device 170 may determine the target distance of the vehicle 10 as in following Equation 1 and Equation 2. FIG. 4 and FIG. 5 are views illustrating a method for determining the target distance based on the moving distance of the front vehicle of the apparatus 100 for controlling the transmission of the vehicle, according to various exemplary embodiments of the present invention.

First, referring to FIG. 4, the calculating device 170 may determine a time point ($t=t_1$) at which the speed of the vehicle 10 is matched with the speed of the front vehicle 20 ($V_C(t)=V_F(t)$). The determining device 170 may determine the moving distance (S1) of the front vehicle 20 and a reduced relative distance (S2) between the vehicle 10 and the front vehicle 20. Referring to FIG. 5, it may be understood that the moving distance of the front vehicle 20 and the relative distance between the vehicle 10 and the front vehicle 20 are determined over time based on the change in the speed of the vehicle 10 and the speed of the front vehicle 20.

$$S_1 = \int_{t_0}^{t_1} V_F'(t)dt$$

$$S_2 = D_{Ref} - D_{offset} \qquad \text{Equation 1}$$

In other words, the calculating device 170 may determine the moving distance ($S_1$) of the front vehicle 20 for the duration from $t_0$ to $t_1$ by integrating the speed (VF) of the front vehicle 20 for the duration from $t_0$ to $t_1$. Furthermore, the calculating device 170 may determine the relative distance ($S_2$) by subtracting the offset distance ($D_{offset}$) from the distance ($D_{Rel}$) between the vehicle 10 and the front vehicle 20.

In the instant case, the offset distance is a target in-vehicle distance to be finally maintained. An exemplary embodiment for the offset value varied depending on the change in the speed of the front vehicle 20 will be described with reference to FIG. 3B.

The calculating device 170 may determine a final target distance ($D_T$) by adding up the moving distance ($S_2$) of the front vehicle 20 and the reduced relative distance ($S_2$) between the vehicle 10 and the front vehicle 20 as in following Equation 2.

$$D_T = S_1 + S_2 = \int_{t_0}^{t_1} V_C(t) dt$$

$$D_T = \int_{t_0}^{t_1} V_F(t) dt + D_{Rel} - D_{offset} \quad \text{Equation 2}$$

In the instant case, the gearshifting stage deciding device 180 may configure a deceleration profile for each gearshifting stage of the transmission based on the target speed and the target distance determined by the calculating device 170, and may determine, as the final gearshifting stage, a gearshifting stage corresponding to the target speed at the target position. In the instant case, the target position may refer to a front position at the target distance from the present position of the vehicle 10.

The deceleration profile for each gearshifting stage of the transmission may be configured through following Equation 3.

$$V_i(t) = A_i t^2 + (B_i - g \sin \theta) t + v_0 \quad \text{Equation 3}$$

In the instant case, "A" is a second curve fitting coefficient, "B" is a first curve fitting coefficient, "i" is the gearshifting stage, "g" is the gravity, "θ" is the gradient, and "$v_0$" is an initial (current) vehicle speed.

An exemplary embodiment for the deceleration profile for each gearshifting stage of the transmission configured through Equation 3 will be described later with reference to FIG. 6.

Figure 6:
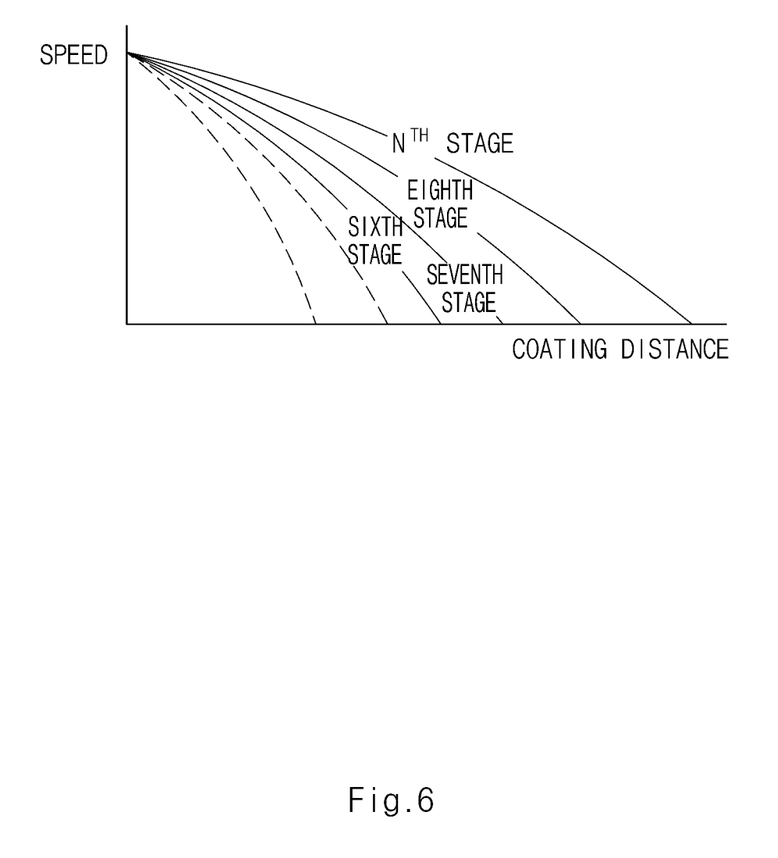
FIG. 6 is a view exemplarily illustrating a deceleration profile according to various exemplary embodiments of the present invention.

The gearshifting stage deciding device 180 decides the final gearshifting stage corresponding to the target speed ($V_{ct}$) at the target position based on the deceleration profile for each gearshifting stage of the transmission, according to an exemplary embodiment of FIG. 6.

The details of the operation of deciding the final gearshifting stage will be described below with reference to FIG. 7.

Figure 7:
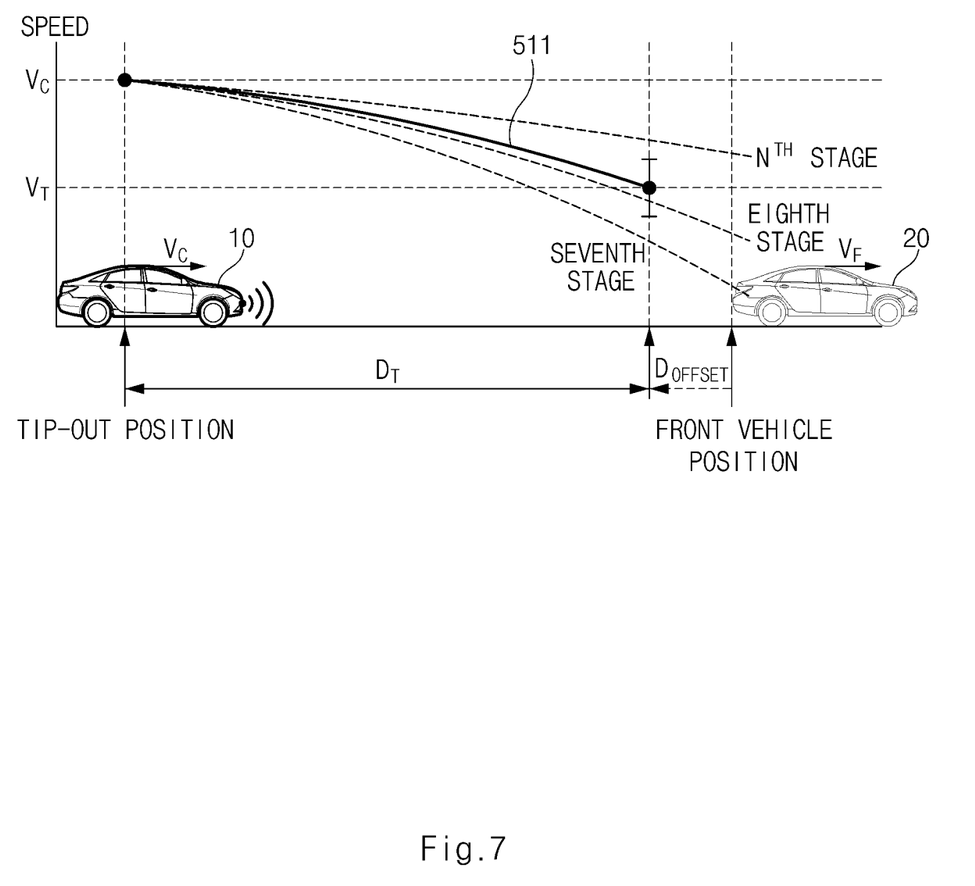
FIG. 7 and FIG. 8 are view exemplarily illustrating embodiments used as references for describing a gear shifting operation of an apparatus of controlling a transmission of a vehicle, according to various exemplary embodiments of the present invention.

Referring to FIG. 7, on the assumption that the present speed of the vehicle 10 is $V_c$, the front vehicle 20 is positioned at a front distance ($D_f$) from the vehicle 10 at a position where the acceleration of the vehicle 10 becomes in the TIP-out state, and the present speed of the front vehicle 20 is $V_f$, the target speed ($V_{ct}$) may be set to a value obtained by adding the critical value ($V_{CAL}$) to the present speed (VF) of the front vehicle 20.

Furthermore, the target distance (DT) may be set to a value obtained by adding up a value obtained by subtracting the offset distance ($D_{offset}$) from the distance ($D_{Rel}$) between the vehicle 10 and the front vehicle 20, and the moving distance of the front vehicle 20.

In the instant case, the gearshifting stage deciding device 180 may decide, as the final gearshifting stage, a gearshifting stage corresponding to the target speed at the target position, when the deceleration profile is applied for each gearshifting stage of the transmission based on the present speed of the vehicle 10.

The gearshifting stage deciding device 180 may decide the final gearshifting stage to an eighth stage, because a deceleration graph 511 to the target position is illustrated between the eighth stage and the $N^{th}$ stage, based on the present speed of the vehicle.

Accordingly, the controller 110 may control the transmission such that the deceleration profile is followed based on the final gearshifting stage decided by the gearshifting stage deciding device 180.

The operation of controlling the transmission of the vehicle according to an exemplary embodiment will be described with reference to FIG. 8.

Figure 8:
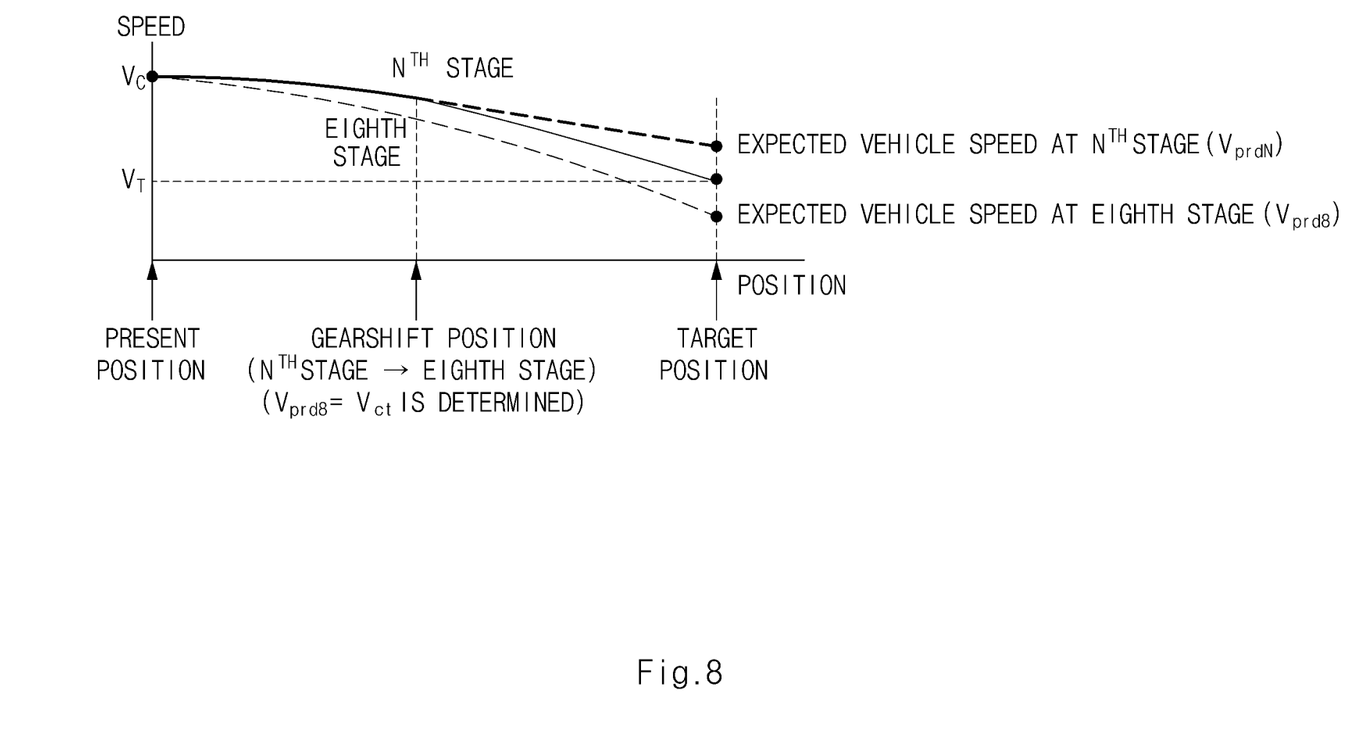

Referring to FIG. 8, the controller 110 performs neutral control to an expected gearshift position from the present position of the vehicle 10. When the vehicle 10 arrives at the expected gearshift position, the controller 110 performs gear shifting from the $N^{th}$ stage to the eighth stage, based on the information on the final gearshifting stage decided by the gearshifting stage deciding device 180. In the instant case, the expected gearshift position may be determined to a deceleration start position in which the expected speed at the target position is the target speed, when deceleration is started based on the deceleration profile corresponding to the eighth stage.

Accordingly, the controller 110 performs the deceleration control such that the speed of the vehicle 10 reaches the target speed at the target position while maintaining the eighth stage from the expected gearshift position to the target position.

Accordingly, the vehicle 10 may decelerate by the target speed without excessive deceleration or re-acceleration until the vehicle 10 arrives at the target position.

According to the exemplary embodiment of the present invention, the apparatus 100 for controlling the transmission of the vehicle having the above operation may be implemented in a form of an independent hardware device including a memory and a processor to process each operation, and may be run in the form included in another hardware device such as a microprocessor or a general purpose computer system.

Figure 9:
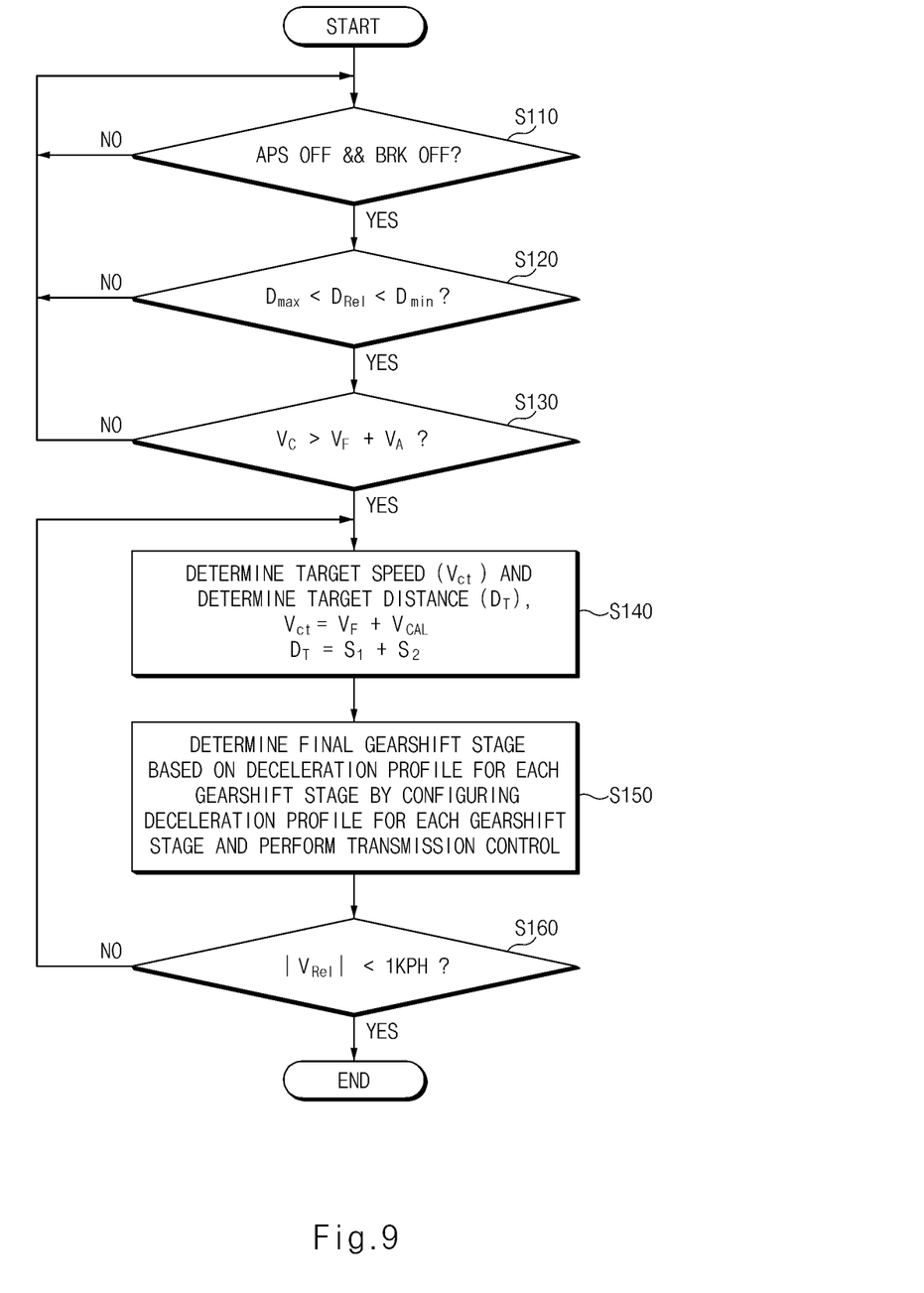
FIG. 9 is a flowchart illustrating an operation of a method for controlling a transmission of a vehicle, according to various exemplary embodiments of the present invention.

The flowchart of the operation of the apparatus of controlling the transmission of the vehicle according to various exemplary embodiments of the present invention will be described below.

FIG. 9 is a flowchart illustrating the operation of a method for controlling a transmission of a vehicle, according to various exemplary embodiments of the present invention.

Referring to FIG. 9, the apparatus 100 for controlling the transmission of the vehicle starts coasting as a brake becomes in an OFF state in the APS OFF state (S110).

Thereafter, when the front vehicle 20 is present, the apparatus 100 for controlling the transmission of the vehicle detects the distance ($D_{Rel}$) between the vehicle 10 and the front vehicle 20 and determines whether the distance ($D_{Rel}$) exceeds a minimum reference distance ($D_{min}$) and is less than a maximum reference distance ($D_{max}$) (S120).

When the apparatus 100 for controlling the transmission of the vehicle determines that the distance ($D_{Rel}$) between the vehicle 10 and the front vehicle 20 satisfies the condition of '$D_{min} < D_{Rel} < D_{max}$', the speed ($V_C$) of the vehicle 10 is compared with the value obtained by adding up the speed ($V_F$) of the front vehicle 20 and the critical value ($V_A$) (S130).

In the instant case, the apparatus 100 for controlling the transmission of the vehicle may determine deceleration following control based on the speed of the front vehicle 20 to be performed, when it is determined that the condition of '$V_C > V_F + V_A$' is satisfied. In other words, the apparatus 100 for controlling the transmission of the vehicle may determine the deceleration following control based on the speed of the front vehicle 20, when it is determined that the states of the vehicle 10 and the front vehicle 20 satisfy all the determination conditions in S120 and S130.

Accordingly, the apparatus 100 for controlling the transmission of the vehicle determines the target speed ($V_{ct}$) and the target distance ($D_T$) to perform the deceleration following control based on the speed of the front vehicle 20 (S140).

In S140, the apparatus 100 for controlling the transmission of the vehicle may determine, as the target speed ($V_{ct}$) of the vehicle 10, the value obtained by adding the critical value ($V_{CAL}$) to the speed of the front vehicle 20. Furthermore, the apparatus 100 for controlling the transmission of the vehicle may set, as the target distance ($D_T$), the value obtained by adding up the value, which is obtained by subtracting the offset distance ($D_{offset}$) from the distance ($D_{Rel}$) between the vehicle 10 and the front vehicle 20, and the moving distance of the front vehicle 20 for the duration of $t_0$ to $t_1$.

When the target speed and the target distance are determined in S140, the apparatus 100 for controlling the transmission of the vehicle may decide the final gearshifting stage based on the deceleration profile for each gearshifting stage of the transmission by configuring the deceleration profile for each gearshifting stage of the transmission (S150). In the instant case, the apparatus 100 for controlling the transmission of the vehicle may decide, as the final gearshifting stage, the gearshifting stage corresponding to the target speed at the target position, based on the deceleration profile for each gearshifting stage of the transmission. Thereafter, the apparatus 100 for controlling the transmission of the vehicle controls the transmission based on the deceleration profile of the decided final gearshifting stage.

Thereafter, the apparatus 100 for controlling the transmission of the vehicle determines whether the relative speed ($V_{Rel}$) between the vehicle 10 and the front vehicle 20 is less than the predetermined speed, for example, 1 kph (S160) to terminate the deceleration control associated with the front vehicle when the relative speed ($V_{Rel}$) is less than the predetermined speed.

As described above, according to various exemplary embodiments of the present invention, when performing the deceleration control associated with the front vehicle and performing coasting deceleration, the vehicle may recognize the distance to the front vehicle through a Light Detection and Ranging (LiDAR) sensor and may select a gearshifting stage for decelerating such that the speed of the vehicle is equal to the speed of the front vehicle at a position based on a proper inter-vehicle distance.

However, when the deceleration control is performed by determining, as the target position, a position obtained by subtracting the proper inter-vehicle distance from the relative distance to the front vehicle, which is detected by the LiDAR sensor, without considering the moving distance of the front vehicle, the vehicle has to decelerate to a significant extent only using engine braking through downshifting within 150 m which is a distance able to be detected by the LiDAR sensor.

Therefore, a downshifting degree becomes excessive due to a larger target decelerating amount, and the front vehicle is continuously moving while the vehicle arrives at a real target position. Accordingly, the relative distance fails to reach the target proper inter-vehicle distance, but the distance between the vehicle and the front vehicle may be increased.

Therefore, according to various exemplary embodiments of the present invention, the target position is determined to determine a gearshifting stage by considering the moving distance of the front vehicle together during the deceleration control, preventing excessive downshifting while following the front vehicle.

Furthermore, according to various exemplary embodiments of the present invention, a new target position may be selected by reflecting the speed of the front vehicle in real time even if the front vehicle is accelerated or decelerated. Accordingly, the vehicle may release the deceleration following control when accelerating or may additionally perform downshifting when decelerating, earlier performing gear shifting to a gearshifting stage advantageous to the following of the front vehicle.

Figure 10:
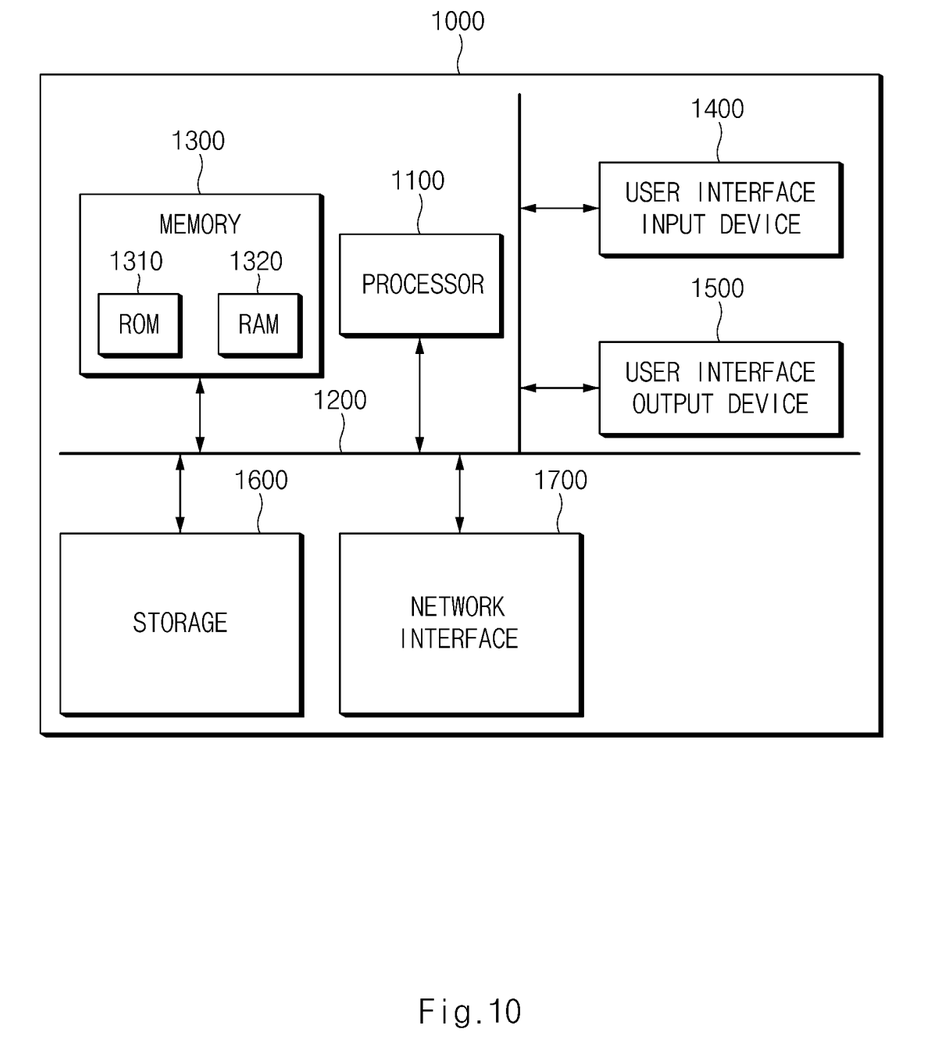
FIG. 10 is a view exemplarily illustrating a determining system to execute a method, according to various exemplary embodiments of the present invention.

FIG. 10 illustrates a computing system, according to various exemplary embodiments of the present invention.

Referring to FIG. 10, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments included in various exemplary embodiments of the present invention may be directly implemented with a hardware module, a software module, or the combinations thereof, executed by the processor 1100. The software module may reside on a storage medium (i.e., the memory 1300 or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to various exemplary embodiments of the present invention, the optimal gearshifting stage may be determined depending on the position, the speed, and the moving distance of the front vehicle when the vehicle decelerates based on the difference in speed between the vehicle and the front vehicle to reduce the number of times to decelerate or decelerate again, improving the driving convenience, and the vehicle may be decelerated with an excellent fuel efficiency.

Besides, a variety of effects directly or indirectly understood through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a transmission of a vehicle, the apparatus comprising:
    a determining device configured to determine whether to perform a front-vehicle-based deceleration following control according to information on the vehicle and information on a front vehicle when coasting of the vehicle is started;
    a calculating device configured to determine a target speed of the vehicle and a target distance according to a position of the front vehicle, a speed of the front vehicle, and a moving distance of the front vehicle, when the front-vehicle-based deceleration following control is determined to be performed;
    a gearshifting stage deciding device configured to decide a final gearshifting stage of the transmission according to the determined target speed and the determined target distance by configuring a deceleration profile for each gearshifting stage of the transmission; and
    a controller connected to the determining device, the calculating device and the gearshifting stage deciding device and configured to control the transmission according to the final gearshifting stage.

2. The apparatus of claim 1, wherein the determining device is configured to perform the front-vehicle-based deceleration following control when a distance between the vehicle and the front vehicle and a speed of the vehicle satisfy predetermined conditions.

3. The apparatus of claim 2, wherein the determining device is configured to determine whether the distance between the vehicle and the front vehicle is greater than a minimum reference distance and is less than a maximum reference distance.

4. The apparatus of claim 2, wherein the determining device is configured to determine whether the speed of the vehicle exceeds a value obtained by adding a set value to the speed of the front vehicle.

5. The apparatus of claim 4, wherein the determining device is configured to perform the front-vehicle-based deceleration following control when the determining device concludes that the distance between the vehicle and the front vehicle is greater than a minimum reference distance and is less than a maximum reference distance, and when the determining device concludes that the speed of the vehicle is greater than the value obtained by adding the set value to the speed of the front vehicle.

6. The apparatus of claim 1, wherein the determining device is configured to determine the target speed by adding a critical value to the speed of the front vehicle.

7. The apparatus of claim 6, wherein the critical value is a value between a minimum critical speed and a maximum critical speed, which are preset, and is varied depending on a change in the speed of the front vehicle.

8. The apparatus of claim 1, wherein the calculating device is configured to determine the target distance obtained by adding up a value, which is obtained by subtracting an offset distance from a distance between the vehicle and the front vehicle, and the moving distance of the front vehicle for a predetermined time.

9. The apparatus of claim 8, wherein the offset distance is set as an inter-vehicle distance maintained according to the speed of the front vehicle.

10. The apparatus of claim 1, wherein the determining device is configured to determine whether a relative speed between the vehicle and the front vehicle is less than a predetermined speed.

11. The apparatus of claim 10, wherein the determining device is configured to release the front-vehicle-based deceleration following control, when the relative speed between the vehicle and the front vehicle is less than the predetermined speed.

12. The apparatus of claim 1,
    wherein the gearshifting stage deciding device is configured to identify a target position from the vehicle according to the target distance, and
    wherein the gearshifting stage deciding device is configured to determine, as the final gearshifting stage, a gearshifting stage corresponding to the target speed at the target position according to the deceleration profile for each gearshifting stage of the transmission.

13. A method for controlling a transmission of a vehicle, the method comprising:
    determining whether to perform a front-vehicle-based deceleration following control according to information on the vehicle and information on a front vehicle when coasting of the vehicle is started;
    determining a target speed of the vehicle and a target distance according to a position of the front vehicle, a speed of the front vehicle, and a moving distance of the front vehicle, when the front-vehicle-based deceleration following control is determined to be performed;
    deciding a final gearshifting stage of the transmission according to the determined target speed and the determined target distance by configuring a deceleration profile for each gearshifting stage of the transmission; and
    controlling the transmission according to the final gearshifting stage.

14. The method of claim 13, wherein the determining of whether to perform the front-vehicle-based deceleration following control includes:
    determining the front-vehicle-based deceleration following control to be performed, when a distance between the vehicle and the front vehicle and a speed of the vehicle satisfy predetermined conditions.

15. The method of claim 14, wherein the determining of whether to perform the front-vehicle-based deceleration following control further includes:
determining whether the distance between the vehicle and the front vehicle is greater than a minimum reference distance and is less than a maximum reference distance.

16. The method of claim 14, wherein the determining of whether to perform the front-vehicle-based deceleration following control further includes:
determining whether the speed of the vehicle is greater than a value obtained by adding a set value to the speed of the front vehicle.

17. The method of claim 13, wherein the determining of the target speed of the vehicle and the target distance includes:
determining the target speed by adding a critical value to the speed of the front vehicle; and
determining the target distance obtained by adding up a value, which is obtained by subtracting an offset distance from a distance between the vehicle and the front vehicle, and the moving distance of the front vehicle for a predetermined time.

18. The method of claim 17, wherein the critical value is a value between a minimum critical speed and a maximum critical speed, which are preset, and is varied depending on a change in the speed of the front vehicle.

19. The method of claim 17, wherein the offset distance is set as an inter-vehicle distance maintained according to the speed of the front vehicle.

20. The method of claim 13, wherein the deciding of the final gearshifting stage includes:
identifying a target position from the vehicle according to the target distance; and
determining, as the final gearshifting stage, a gearshifting stage corresponding to the target speed at the target position according to the deceleration profile for each gearshifting stage of the transmission.

* * * * *